United States Patent
Elaasar

(10) Patent No.: US 7,900,213 B2
(45) Date of Patent: Mar. 1, 2011

(54) GENERIC MARKUP SPECIFIED OBJECT DESCRIPTOR FOR A MODULARIZED COMPUTING APPLICATION

(75) Inventor: Maged E. Elaasar, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1458 days.

(21) Appl. No.: 11/243,087

(22) Filed: Oct. 4, 2005

(65) Prior Publication Data

US 2007/0089084 A1    Apr. 19, 2007

(51) Int. Cl.
    *G06F 9/445* (2006.01)
(52) U.S. Cl. .................. 719/318; 719/313; 719/323
(58) Field of Classification Search ............. 719/318
    See application file for complete search history.

(56) References Cited

U.S. PATENT DOCUMENTS

| | | | |
|---|---|---|---|
| 2001/0011368 A1 | 8/2001 | Graser et al. | |
| 2002/0035569 A1 | 3/2002 | Clark et al. | |
| 2002/0107995 A1* | 8/2002 | Skaringer et al. | 709/315 |
| 2003/0063124 A1 | 4/2003 | Melhem et al. | |
| 2003/0159130 A1 | 8/2003 | Broussard et al. | |
| 2003/0177477 A1 | 9/2003 | Fuchs | |
| 2003/0208473 A1 | 11/2003 | Lennon | |
| 2004/0015840 A1 | 1/2004 | Walker | |
| 2004/0117776 A1 | 6/2004 | Pazandak | |
| 2005/0027507 A1* | 2/2005 | Patrudu | 704/1 |
| 2006/0288353 A1* | 12/2006 | King et al. | 719/331 |

* cited by examiner

*Primary Examiner* — Hyung S Sough
*Assistant Examiner* — Syed Roni
(74) *Attorney, Agent, or Firm* — Steven M. Greenberg, Esq.; Carey Rodriguez Greenberg Paul, LLP

(57) ABSTRACT

The invention includes a generic, markup specified object descriptor for a modularized computing application. The invention can include an extension to a modular computing application and a markup parser coupled to the extension. The markup parser can be enabled to process a generic, markup specified descriptor for an object. The descriptor can include an object reference referring to the object, a class reference for the object reference, and one or more method references for the object reference. Each method reference can specify a name for a method defined for the object and at least one of a value attribute and a not value attribute. The markup parser can be enabled to process the descriptor to reflectively determine a type and state of the object and to compare the state with either or both of the value and not value attribute to determine whether an expected context exists for the object.

9 Claims, 2 Drawing Sheets

GENERIC MARKUP SPECIFIED OBJECT DESCRIPTOR FOR A MODULARIZED COMPUTING APPLICATION

BACKGROUND OF THE INVENTION

1. Field of the Invention

The present invention relates to the run-time loading of objects in a modularized computing application, and more particularly to the processing of an object descriptor to identify an object at run-time and to determine whether to load its owning module at run-time in a modularized computing application.

2. Description of the Related Art

Legacy computing applications generally involved the combined operation of a computing logic and resources in a single distribution of code. Typically, the computing logic included one or more object files bound by an executable object. The resources, in turn, included presentation objects such as user interface widgets and raw data for use by the computing logic. The most simple computing applications involved a mere single executable file the most complex computing applications involved multiple dynamic libraries linked to an executable object for loading and unloading at the behest of the executable object.

The development and maintenance of legacy computing applications reflected the early software development culture where a single person or company exclusively controlled the lifecycle of the application. Modern computing notions, however, no longer presume that a single entity controls the lifecycle of an application. Driven by a merger of concepts—both open source and modular componentization of application logic—modern application development allows for a modularized computing application permitting the extension of the application by end users and third parties. Thus, for many applications, only the most elemental aspects of the application are distributed at first. The more robust development of the application is left to the end users.

A modular computing application often involves a core application and a plug-in mechanism included as part of the core application to permit the dynamic extension of the core application at run-time. Considering the ECLIPSE(™) platform, for instance, (ECLIPSE is a trademark of the Eclipse Foundation, Inc.), a basic, modular computing environment for code development is provided along with a plug-in mechanism dependent upon extension points provided by third parties, and a registry of extensions loaded for use within the core environment. The architecture of the ECLISPE platform is well-known and can be found in literature provided at a Web site maintained by the Eclipse Foundation and as described in United States Patent Publication No. US 2004/0003371 A1 by Coulthard et al.

In a modularized computing application, an extension to the core components of the application can be provided along with a manifest, often encoded in markup such as markup conforming to a markup language such as the extensible markup language (XML). The manifest, sometimes referred to as an object descriptor, can specify the extension by name and can list extension points of other extensions which are extended by the specified extension point. The object descriptor further can specify extension points to the specified extension which can be referenced by other extensions to the specified extension. At run-time, the object descriptor can be processed by the core component to determine which extensions can be loaded in order to extend the core component and other extensions to the core component.

The use of the object descriptor structure for modularized computing applications can facilitate the identification of an extension and the deferral of loading of the extension as a plug-in to an application until such time as the plug-in is required. Before loading a plug-in, oftentimes it is required to check the context of the environment to determine whether or not to permit the loading of the plug-in. Generally, context checking is performed by the plug-in itself as a private matter to the plug-in and often involves the identification of an object to determine its applicability as a context to the plug-in. Yet, at present, the context, which is a referenced object, can be determined from the fully qualified name of the class of the object itself. Alternatively, property-value pairs for the object can be inspected only so long as the object conforms to a specified interface.

BRIEF SUMMARY OF THE INVENTION

Embodiments of the present invention address deficiencies of the art in respect to object descriptors in a modularized computing application and provide a novel and non-obvious method, system and computer program product for a generic, markup specified object descriptor for a modularized computing application. In one embodiment of the invention, an object context checking data processing system can include an extension to a modular computing application, such as a code development platform, and a markup parser coupled to the extension. The markup parser can be an XML parser enabled to process a generic, markup specified descriptor for an object, such as an XML formatted descriptor, to reflectively determine a type and state of the object.

The generic markup specified descriptor can include an object reference referring to the object, a class reference for the object reference, and one or more method references for the object reference. Each of the method references can specify a method name for a method defined for the object and at least one of a value attribute and a not value attribute. In this regard, the markup parser can be enabled to process the generic, markup specified descriptor for an object to reflectively determine a type and state of the object and to compare the determined state with either or both of the value attribute and the not value attribute to determine whether an expected context exists for the object.

In another embodiment of the invention, a method for checking context for an object in a modular computing application can include parsing a generic, markup specified object descriptor for a corresponding object, reflectively invoking at least one method specified within the descriptor, comparing a result of the reflectively invoked method to a value specified within the descriptor, and determining whether an expected context exists for the corresponding object based upon the comparison. Notably, the reflective invocation of at least one method specified within the descriptor can include recursively reflectively invoking a plurality of methods specified within the descriptor.

Comparing a result of the reflectively invoked method to a value specified within the descriptor can include comparing the result of the reflectively invoked method with a value attribute specified within the descriptor. Comparing a result of the reflectively invoked method to a value specified within the descriptor also can include comparing the result of the reflectively invoked method with a not value attribute specified within the descriptor. Finally, the method can include plugging-in an extension to the modular computing application if it is determined that an expected context exists for the corresponding object based upon the comparison.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for context checking an object using a generic, markup specified object descriptor in a modularized computing application. In accordance with an embodiment of the present invention, a generic, markup specified object descriptor for an object in a modularized computing application can be provided. The descriptor can be declared by extension points and used by extensions of the modularized computing application to describe any object context. The descriptor can check the object both by its type and state. For state checking, the object allows corresponding getter methods to be called by reflection. Additionally, the getter methods can be called at any nested level by calling the getter methods by reflection recursively. Finally, parametric getter methods can be accommodated.

Figure 1:
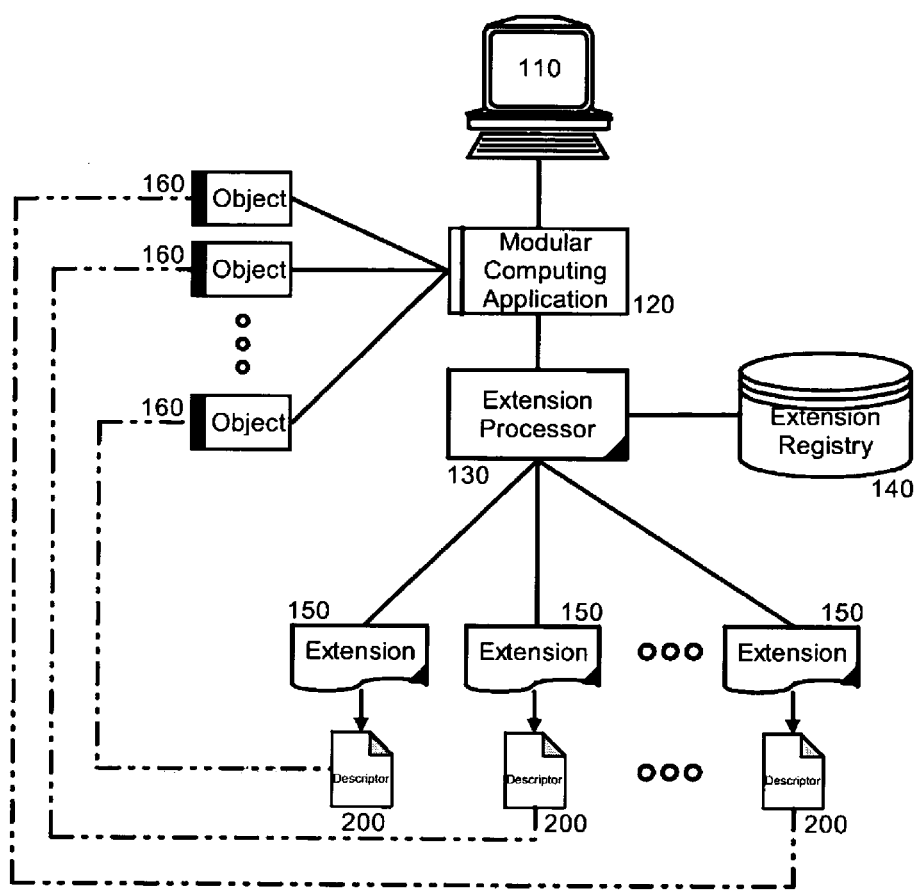
FIG. 1 is a schematic illustration of a data processing system configured for context checking using a generic, markup specified object descriptor.

In illustration of a particular embodiment of the invention, FIG. 1 is a schematic illustration of a data processing system configured for context checking using a generic, markup specified object descriptor. As shown in FIG. 1, the data processing system can include a modular computing application 120 such as the ECLIPSE platform disposed in a host computing device 110. The modular computing platform 120 can include a number of application objects 160, including user interface elements and other programmatic resources. Also, the modular computing platform 120 also can include extension processing logic 130 coupled to an extension registry 140.

The extension processing logic 130 can include program code enabled to identify available extensions 150 to the modular computing application 120 which can be listed in the extension registry 140 as available plug-ins to the modular computing application 120. In accordance with the present invention, each extension 150 can be configured to process generic markup specified object descriptors 200 to establish a context as part of loading as a plug-in to the modular computing application 200. Specifically, each of the generic markup specified object descriptors 200 can be associated with a corresponding object 160 in the modular computing application 120.

Each generic markup specified object descriptor 200 can specify one or more methods of a corresponding object 160 for determining the type and state of the corresponding object 160 reflectively. Importantly, the reflective nature of determining the type and state of the object 160 can obviate the need for prior assumptions regarding the use of the object 160 with the extension 150. In more particular illustration of the structure of the generic markup specified object descriptor 200, FIG. 2 is a block diagram of a generic, markup specified object descriptor for a modularized computing application.

Figure 2:
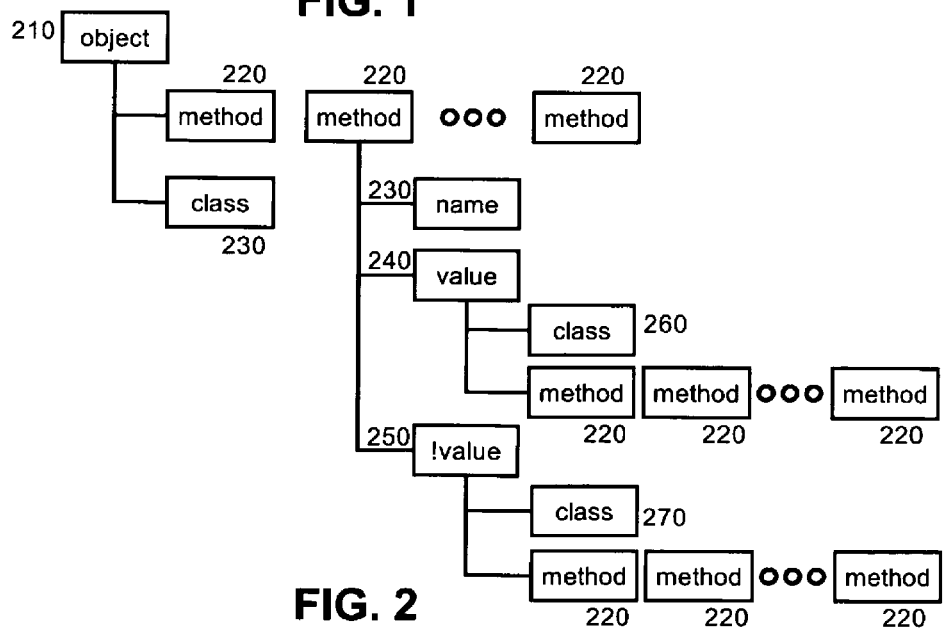
FIG. 2 is a block diagram of a generic, markup specified object descriptor for a modularized computing application; and, FIG. 3 is a flow chart illustrating a process for context checking an object using a generic, markup specified object descriptor in a modularized computing application.

As shown in FIG. 2, a generic, markup specified object descriptor can include an object reference 210 within markup, such as markup which conforms to XML. The object reference 210 can refer to an associated object. The object reference 210 can include the specification of one or more methods 220 which can be invoked upon the associated object. The object reference 210 also can include the fully qualified name of a class or interface 230 which is assignable to or adaptable from the reference object.

Each method 220 can be invoked by reflection on the referenced object. The method 220 can include a name 230 and corresponding anticipated value which can include the attributes value 240 and not value 250. The attributes of value 240 and not value 250 can include string or object representations and can be applied logically in the form of processing rules. The processing rules of evaluation can include the requirement that a string value or object representation specified in the value attribute 240 must be present in the return value from the invocation of the method 220. Likewise, the string value or object representation specified in the not value attribute 250 must not be present in the return value from the invocation of the method 220.

The name 230 can represent a nested invocation of a getter method by reflection on the referenced object. The format can include a comma separated list of method names and method parameters. Finally, the value attribute 240 and the not value attribute 250 each can include an object descriptor, which is again class name 260, 270 representing a fully qualified class or interface which is assignable to or adaptable from the value attribute 240 and the not value attribute 250, respectively, and a set of methods to invoke on the value object 240 or the not value object 250.

In operation, an XML parser coupled to the extension can parse the object descriptor using the foregoing schema. The XML parser can use reflection to ensure that the referenced object implements or extends the type specified by class 230. For the specified methods 220, the XML parser can invoke the methods by reflection and compare the resulting values to the attributes of value 240 and not value 250. Based upon the comparison, the object can be identified as having a proper or improper context for use by the extension.

Figure 3:
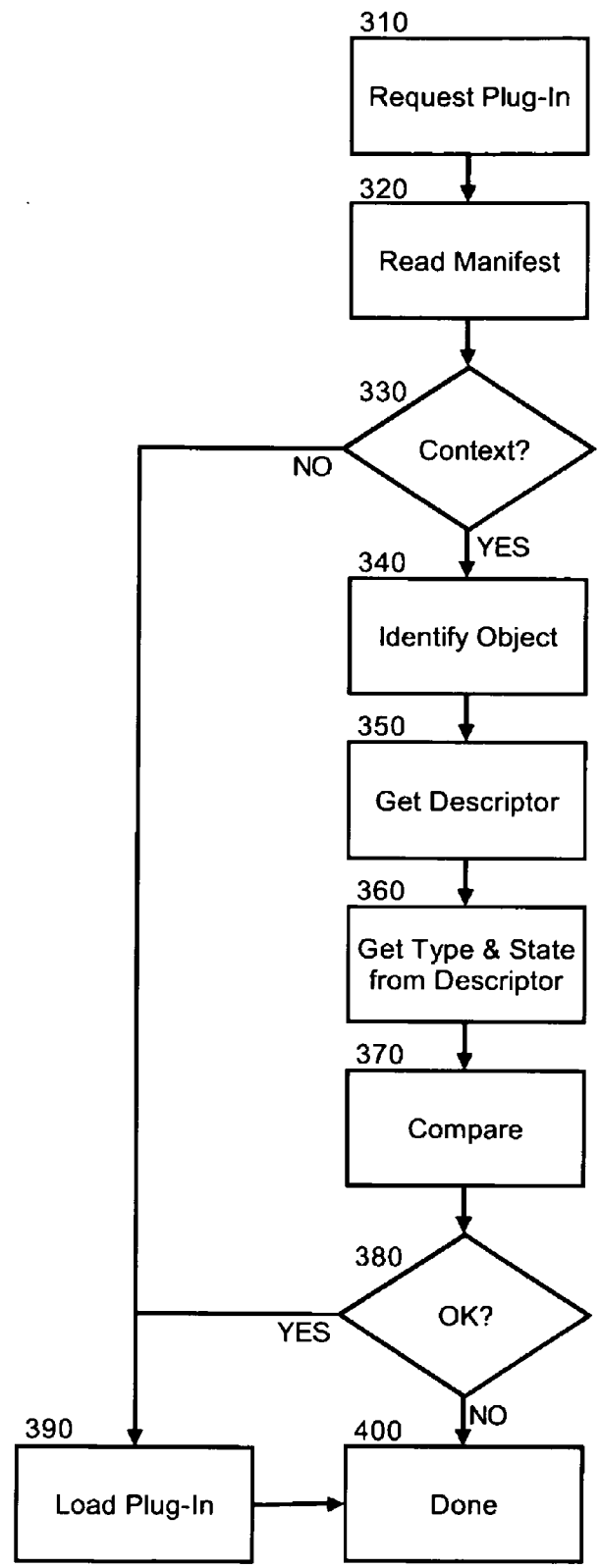

In further illustration, FIG. 3 is a flow chart illustrating a process for context checking an object using a generic, markup specified object descriptor in a modularized computing application. Beginning in block 310, a plug-in can be requested for addition to a modular computing application. In block 320, the manifest for the plug-in can be processed and in decision block 330, it can be determined whether a particular context is required prior to adding the plug-in to the modularized computing application. If not, the plug-in can be loaded in block 390 and the process can end in block 400. Otherwise, the process can continue through block 340.

In block 340, the object associated with the required context can be identified and in block 350, a descriptor for the object can be retrieved for processing. In block 360, the type and state of the descriptor can be obtained through the reflective invocation of methods specified for the object by the descriptor. In block 370, the resulting values from the reflective method invocations can be compared to expected values and forbidden values specified by the descriptor. In decision block 380, if the context is considered satisfactory, in block 390 the plug-in can be loaded having verified the proper context. Otherwise, the process can end in block 400.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain, store or communicate the program for use by or in connection with the instruction execution system, apparatus, or device. The medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk - read only memory (CD-ROM), compact disk - read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. An object context checking data processing system comprising:
   a host computing platform with at least one processor and memory;
   an extension to a modular computing application executing in the host computing platform; and,
   a markup parser coupled to the extension and enabled to process a generic, markup specified descriptor for an object to reflectively determine a type and state of the object;
   wherein the generic markup specified descriptor comprises:
   an object reference referring to the object;
   a class reference for the object reference; and,
   a plurality of method references for the object reference, each of the method references specifying a method name for a method defined for the object and at least one of a value attribute and a not value attribute;
   wherein the markup parser is enabled to process the generic, markup specified descriptor for an object to reflectively determine a type and state of the object and to compare the determined state with one of the value attribute and the not value attribute to determine whether an expected context exists for the object.

2. A method for checking context for an object in a modular computing application, the method comprising:
   parsing in a markup parser coupled to an extension to a modular computing application executing in memory by at least one process of a host computing platform a generic, markup specified object descriptor for a corresponding object;
   reflectively invoking at least one method specified within the descriptor;
   comparing a result of the reflectively invoked method to a value specified within the descriptor; and,
   determining whether an expected context exists for the corresponding object based upon the comparison.

3. The method of claim 2, wherein the reflectively invoking of at least one method specified within the descriptor, comprises recursively reflectively invoking a plurality of methods specified within the descriptor.

4. The method of claim 2, wherein the comparing of a result of the reflectively invoked method to a value specified within the descriptor, comprises comparing the result of the reflectively invoked method with one of a value attribute specified within the descriptor, and a not value attribute specified within the descriptor.

5. The method of claim 2, further comprising plugging-in an extension to the modular computing application if it is determined that an expected context exists for the corresponding object based upon the comparison.

6. A computer program product comprising a non-transitory computer usable medium having computer usable program code for checking context for an object in a modular computing application, the computer program product including:
   computer usable program code for parsing a generic, markup specified object descriptor for a corresponding object;
   computer usable program code for reflectively invoking at least one method specified within the descriptor;
   computer usable program code for comparing a result of the reflectively invoked method to a value specified within the descriptor; and,
   computer usable program code for determining whether an expected context exists for the corresponding object based upon the comparison.

7. The computer program product of claim 6, wherein the computer usable program code for reflectively invoking of at least one method specified within the descriptor, comprises computer usable program code for recursively reflectively invoking a plurality of methods specified within the descriptor.

8. The computer program product of claim 6, wherein the computer usable program code for comparing of a result of the reflectively invoked method to a value specified within the descriptor, comprises computer usable program code for comparing the result of the reflectively invoked method with one of a value attribute specified within the descriptor, and a not value attribute specified within the descriptor.

9. The computer program product of claim 6, further comprising computer usable program code for plugging-in an extension to the modular computing application if it is determined that an expected context exists for the corresponding object based upon the comparison.

* * * * *